(12) United States Patent
So et al.

(10) Patent No.: US 11,175,759 B2
(45) Date of Patent: Nov. 16, 2021

(54) DISPLAY APPARATUS WITH INTEGRATED ANTENNA

(71) Applicant: LG Display Co., Ltd., Seoul (KR)

(72) Inventors: Byeong-Seong So, Paju-si (KR); Youngsung Cho, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/714,438

(22) Filed: Dec. 13, 2019

(65) Prior Publication Data

US 2020/0209995 A1 Jul. 2, 2020

(30) Foreign Application Priority Data

Dec. 31, 2018 (KR) .................. 10-2018-0173502

(51) Int. Cl.
*G06F 3/041* (2006.01)
*H01Q 1/24* (2006.01)

(52) U.S. Cl.
CPC ............... *G06F 3/041* (2013.01); *H01Q 1/24* (2013.01); *G06F 2203/04111* (2013.01)

(58) Field of Classification Search
CPC .. G06F 2203/04111; G06F 2203/04112; G06F 3/04166; G06F 2203/04103; G06F 2203/04107; G06F 3/0443; G06F 3/0446; G06F 3/0412; G06F 3/0416; G06F 1/1626; G06F 3/044; G06F 3/041–046; H01Q 1/24; H01Q 21/065; H01Q 1/243; H01Q 1/22; H01Q 1/38; H01Q 21/00
See application file for complete search history.

(56) References Cited

U.S. PATENT DOCUMENTS

| | | | |
|---|---|---|---|
| 10,326,196 B2 | 6/2019 | Kim et al. | |
| 10,732,764 B1* | 8/2020 | Shanmugam | ......... G06F 3/0446 |
| 2008/0198076 A1 | 8/2008 | Andersson et al. | |
| 2012/0034888 A1 | 2/2012 | Flaviis | |
| 2016/0093939 A1 | 3/2016 | Kim et al. | |

(Continued)

FOREIGN PATENT DOCUMENTS

| | | |
|---|---|---|
| CN | 107667428 A | 2/2018 |
| CN | 105529539 B | 6/2018 |

(Continued)

OTHER PUBLICATIONS

European Patent Office, Extended European Search Report and Opinion, EP Patent Application, EP Patent Application No. EP19218791. 2, dated Aug. 11, 2020, 29 pages.

*Primary Examiner* — Michael J Jansen, II
*Assistant Examiner* — Ivelisse Martinez Quiles
(74) *Attorney, Agent, or Firm* — Fenwick & West LLP

(57) ABSTRACT

Disclosed is a display apparatus with an integrated antenna, in which an antenna and a touch screen are embedded, and the display apparatus comprises a display panel including a touch screen and an antenna electrode, wherein the display panel is divided into a display area and a non-display area surrounding the display area and includes a pixel array part including pixel driving circuits provided in the display area and an electrode array part provided on the pixel array part and including the touch screen and the antenna electrode, the display area includes a pixel including the pixel driving circuit, and a portion of the touch screen is open.

8 Claims, 11 Drawing Sheets

(56) References Cited

U.S. PATENT DOCUMENTS

| | | | |
|---|---|---|---|
| 2016/0188092 A1* | 6/2016 | Sebastian | G06F 3/045 345/174 |
| 2017/0237152 A1* | 8/2017 | Lee | H01Q 5/371 343/702 |
| 2017/0285844 A1 | 10/2017 | Park et al. | |
| 2017/0309995 A1 | 10/2017 | Kim et al. | |
| 2018/0034130 A1* | 2/2018 | Jang | H01Q 1/2266 |
| 2018/0188838 A1* | 7/2018 | An | G06F 3/0446 |
| 2020/0227819 A1* | 7/2020 | Oh | G06F 3/0412 |

FOREIGN PATENT DOCUMENTS

| | | |
|---|---|---|
| EP | 1079296 A2 | 2/2001 |
| KR | 10-2012-0013907 A | 2/2012 |
| KR | 10-2015-0104509 A | 9/2015 |
| KR | 10-2016-0036436 A | 4/2016 |
| KR | 10-2018-0099234 A | 9/2018 |

\* cited by examiner

DISPLAY APPARATUS WITH INTEGRATED ANTENNA

CROSS-REFERENCE TO RELATED APPLICATIONS

The application claims the priority of Republic of Korea Patent Application No. 10-2018-0173502 filed on Dec. 31, 2018, in the Korean Intellectual Property Office, the disclosure of which is incorporated herein by references in its entirety.

BACKGROUND

Field of the Disclosure

The present disclosure relates to display apparatus having a touch screen and an antenna.

Discussion of the Related Art

A touch screen is a type of input device that allows a user to input information by touching a display screen with a finger or a pen, while viewing the screen.

In other words, electronic devices such as televisions, mobile phones, tablet computers, navigation device, a game device, or the like has a touch screen capable of recognizing a user's touch.

Also, electronic devices such as mobile phones and tablet computers have antennas for performing communication via a network.

SUMMARY

Accordingly, the present disclosure is directed to providing a display apparatus with an integrated antenna that substantially obviate one or more problems due to limitations and disadvantages of the related art.

An aspect of the present disclosure is directed to providing a display apparatus with an integrated antenna, in which an antenna and a touch screen are embedded.

To achieve these and other advantages and in accordance with the purpose of the disclosure, as embodied and broadly described herein, there is provided a display apparatus with an integrated antenna including a display panel including a touch screen and an antenna electrode. The display panel is divided into a display area and a non-display area surrounding the display area and includes a pixel array part including pixel driving circuits provided on the display area and an electrode array part provided on the pixel array part and including the touch screen and the antenna electrode. The display area includes pixels each including the pixel driving circuit, and a portion of the touch screen is open.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
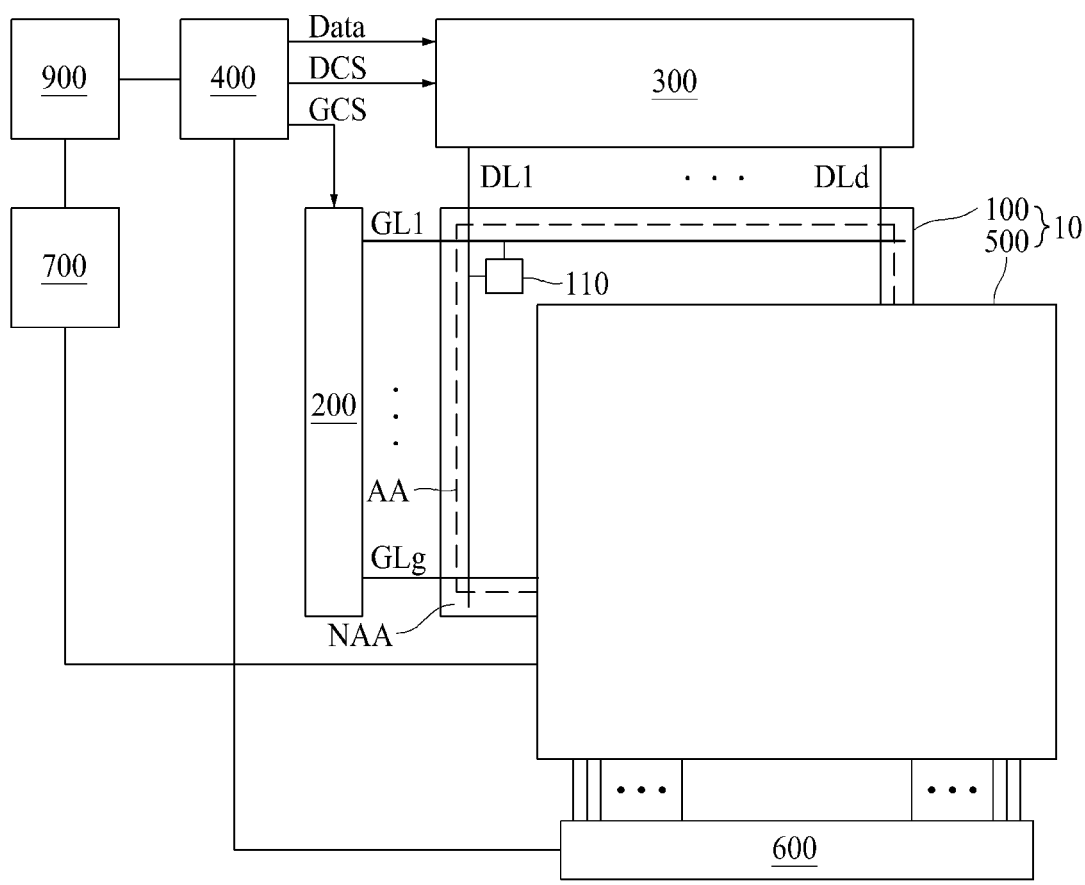
FIG. 1 is an exemplary view showing a display apparatus with an integrated antenna according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known technology is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of a display apparatus with an integrated antenna according to the present disclosure will be described in detail with reference to the accompanying drawings. In adding reference numerals to elements of each of the drawings, although the same elements are illustrated in other drawings, like reference numerals may refer to like elements.

FIG. 1 is a diagram illustrating an example of a display apparatus with an integrated antenna according to an embodiment of the present disclosure.

The display apparatus with an integrated antenna according to the present disclosure includes a display panel 10 including a touch screen and an antenna electrode, a gate driver 200 transmitting a scan signal to gate lines GL1 to GLg provided in the display panel, a data driver 300 supplying data voltages to data lines DL1 to DLd provided in the display panel 10, a controller 400 controlling the gate driver 200 and the data driver 300, an antenna driver 700 transmitting an antenna signal transmitted from an external system to a wireless communication network via the antenna electrode or transmitting an antenna signal received from the antenna electrode to the external system, and a touch driver 600 driving the touch screen.

In the following, the above-described elements are sequentially described.

First, the gate driver 200 generates scan signals using gate control signals GCS transmitted from the controller 400 and then supplies the scan signals to the gate lines GL1 to GLg.

The gate driver 200 is formed independently of the display panel 10 and is connected to the display panel 10 through a tape carrier package (TCP), a chip-on film (COF), or a flexible printed circuit board (FPCB). However, the gate driver 200 may be formed directly in a non-display area of the display panel 10 using a gate in panel (GIP) method.

Next, the data driver 300 converts image data transmitted from the controller 400 into data voltages and then supplies the data voltages to the data lines DL1 to DLd.

Next, the controller 400 generates a gate control signal GCS for controlling driving of the gate driver 200 and a data control signal DCS for controlling driving of the data driver 300 using a timing synchronization signal input from the external system 900. Further, the controller 400 converts input image data input from the external system 900 into image data and transmits the image data to the data driver 300.

Next, the antenna driver 700 transmits the antenna signal transmitted from the external system 900 to a wireless communication network through the antenna electrode provided in the display panel 10 or transmits the antenna signal received from the antenna electrode to the external system 900.

Thereafter, the touch driver 600 determines whether the display panel 10 is touched using touch sensing signals received from the touch screen. A touch position of the display panel 10 may be determined by the touch driver 600 or may be determined by the controller 400 that receives information related to the touch from the touch driver 600.

Lastly, the display panel 10 is divided into a display area AA and a non-display area NAA surrounding the display area AA and includes a pixel array part 100 including pixel driving circuits and light emitting devices provided on the display area AA and an electrode array part 500 provided on the pixel array part 100 and including the touch screen and the antenna electrode. In the display area AA, a pixel 110 including the pixel driving circuit and the light emitting device is provided, and a portion corresponding to the light emitting device of the touch screen is open.

The display area AA is provided in an intermediate area of the display panel 10 and may be defined as an area for displaying an image. The display area AA may have a rectangular shape, a rectangular shape in which each corner portion has a predetermined radius of curvature, or a non-square shape having at least six sides, or may be formed in various shapes. The non-display area NAA surrounds the display area AA, and thus the shape of the non-display area NAA may be variously changed according to the shape of the display area AA.

A specific structure of the display panel 10 will be described below with reference to the drawings.

Figure 2:
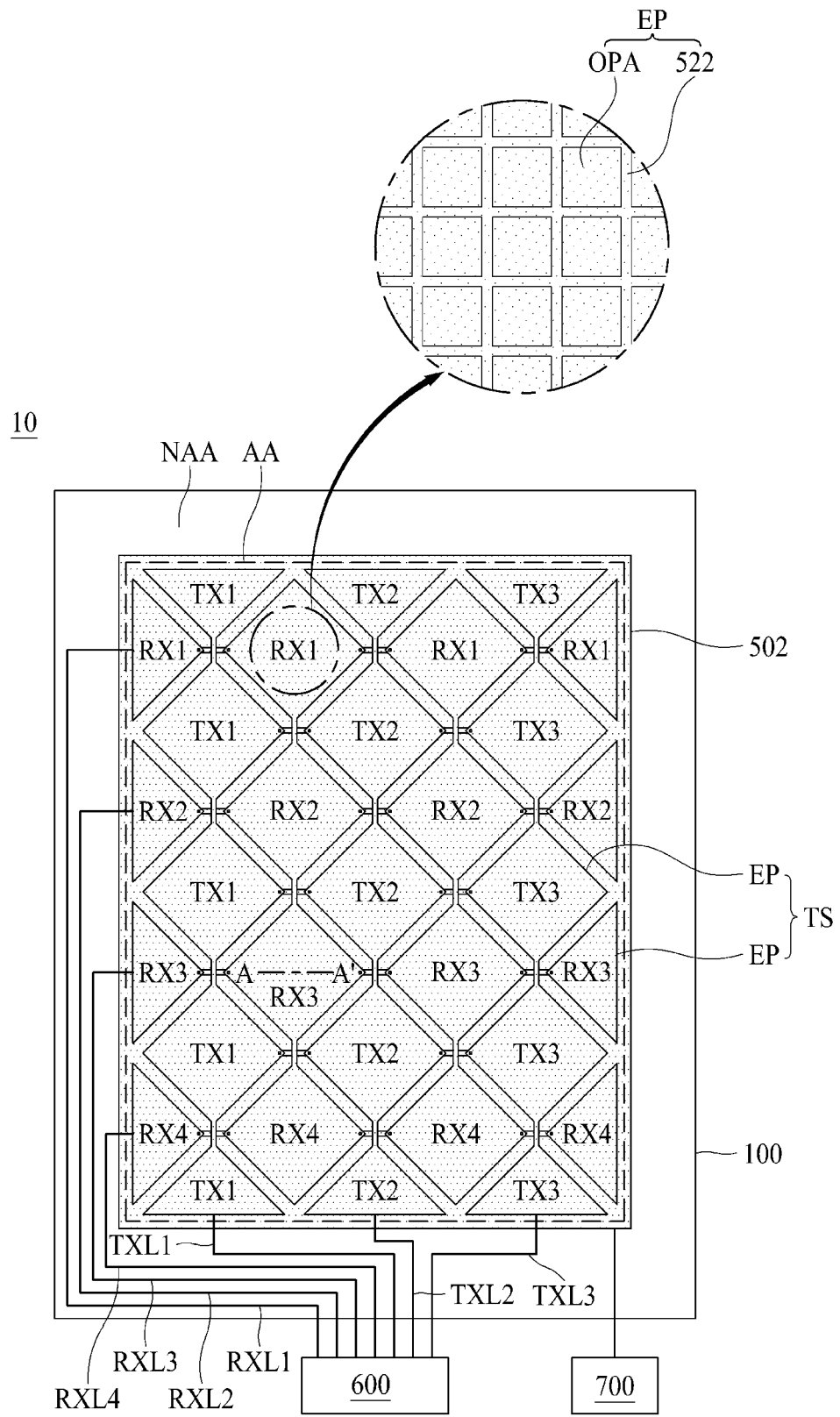
FIG. 2 is an exemplary view showing a planar structure of a display panel applied to a display apparatus with an integrated antenna according to an embodiment of the present disclosure.
Figure 3:
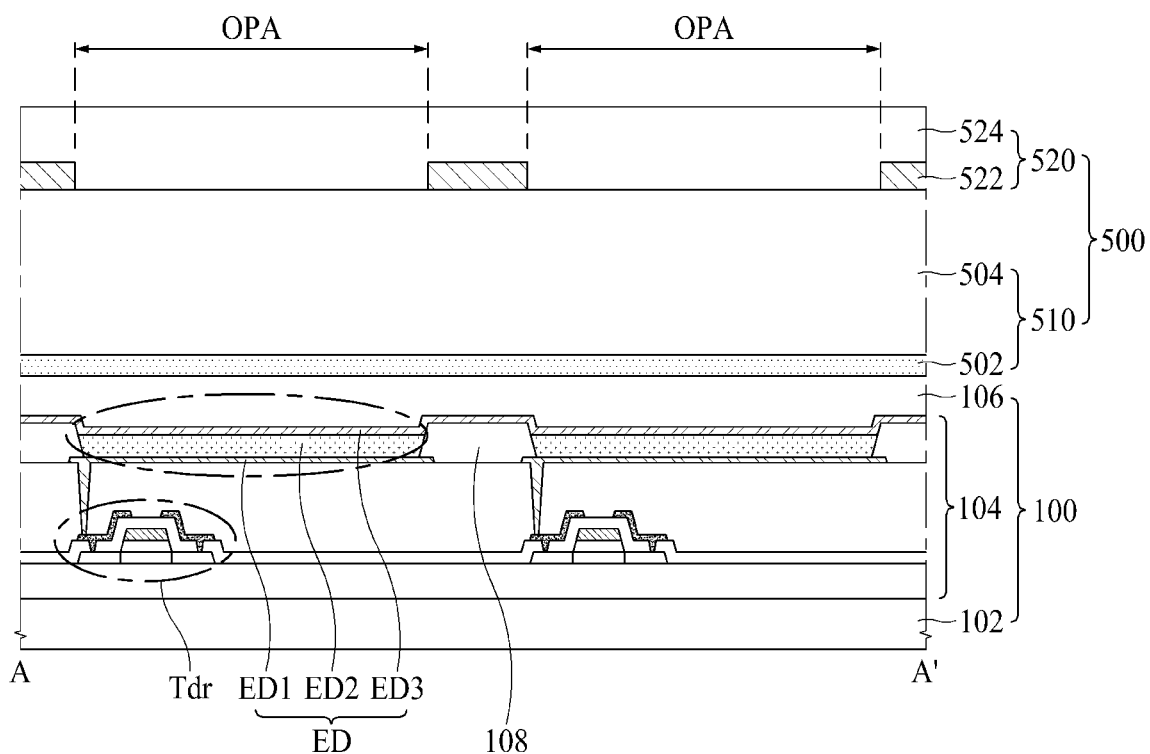
FIG. 3 is a cross-sectional view taken along line A-A' of FIG. 2 according to an embodiment of the present disclosure.

FIG. 2 is a view showing a planar structure of a display panel applied to a display apparatus with an integrated antenna according to an embodiment of the present disclosure, and FIG. 3 is a cross-sectional view taken along line A-A' of FIG. 2 according to an embodiment of the present disclosure. Since the line A-A' in FIG. 3 extends over two pixels, a cross-section of two pixels is shown in FIG. 3.

The display panel 10 applied to the display apparatus with an integrated antenna according to the present disclosure is divided into the display area AA and the non-display area NAA as shown in FIGS. 1 to 3.

The display panel 10 may be a panel including a light emitting device such as an organic light emitting diode, or a panel including liquid crystal. Hereinafter, for convenience of explanation, the display panel 10 including a light emitting device will be described as an example of the present disclosure.

When the display panel 10 is a panel including a light emitting device, a pixel 110 including the pixel driving circuit and the light emitting device ED is provided in the display area AA.

That is, as illustrated in FIGS. 2 and 3, the display panel 10 includes the substrate 102 including the display area AA and the non-display area NAA surrounding the display area AA, a pixel array layer 104 including the pixel driving circuits and the light emitting devices ED provided on the display area AA, an insulating layer 106 covering the pixel array layer 104, an antenna electrode 502 provided on the insulating layer 106, an encapsulation layer 504 provided on the antenna electrode 502, a touch screen TS provided on the encapsulation layer 504, and a passivation layer 524 covering the touch screen TS.

The substrate 102 is a base substrate (or base layer) and includes a plastic material or a glass material.

The pixel array layer 104 includes the pixel driving circuits and the light emitting devices (EDs).

The pixel driving circuit controls the amount of current flowing in the light emitting device ED based on a data voltage supplied from the data line DL in response to a scan signal supplied from one gate line GL.

For example, the pixel driving circuit may include two thin film transistors and one capacitor. In this case, the pixel driving circuit may include a driving transistor Tdr controlling the amount of current supplied to the light emitting device ED according to the data voltage, a switching transistor supplying the data voltage supplied from the data line DL to the driving transistor Tdr, and a capacitor storing a voltage between a gate and a source of the driving transistor Tdr.

In addition to the above components, the pixel driving circuit may further include at least one transistor for sensing a characteristic change of the driving transistor Tdr or compensating for a change in characteristic of the driving transistor Tdr.

The light emitting device ED emits light by a current supplied from the pixel driving circuit and emits light having a luminance corresponding to a magnitude of the current.

The light emitting device ED includes, a first electrode ED1 electrically connected to the driving transistor Tdr, a light emitting layer ED2 formed on the first electrode ED1, and a second electrode ED3 electrically connected to the light emitting layer ED2. That is, the light emitting device ED includes the first electrode ED1, the light emitting layer ED2 provided on the first electrode ED1, and the second electrode ED3 provided on the light emitting layer ED2.

The light emitting layer ED2 may include any one of a blue light emitting portion, a green light emitting portion, and a red light emitting portion for emitting light having a color corresponding to a color set in the pixel 110. The light emitting layer ED2 may include any one of an organic light emitting layer, an inorganic light emitting layer, and a quantum dot light emitting layer, or may include a stacked or mixed structure of the organic light emitting layer (or the inorganic light emitting layer) and the quantum dot light emitting layer.

As described above, the pixel array layer 104 may include the pixel driving circuits and the light emitting devices ED. FIG. 3 shows the driving transistor Tdr, which constitutes the pixel driving circuit, and the light emitting device ED connected to the driving transistor Tdr.

Hereinafter, for convenience of explanation, the first electrode ED1 constituting the light emitting device ED is referred to as an anode, and the second electrode ED3 is referred to as a cathode.

The cathode ED3 is provided on the entire surface of the display area AA of the display panel 10 as shown in FIG. 3.

The insulating layer 106 covers the pixel array layer 104, and particularly covers the cathode ED3. The insulating layer 106 may be formed of a dielectric. For example, the insulating layer 106 may be formed of a material such as silicon nitride (SiNx) or silicon oxide (SiOx).

In the present disclosure, the cathode ED3, the insulating layer 106, and the antenna electrode 502 form an antenna.

The antenna electrode 502 is provided on the insulating layer 106. The antenna electrode 502 may be formed of a transparent conductive material, that is, a metal.

That is, the cathode ED3 connected to a ground, the antenna electrode 502 formed of a transparent conductive material, and the insulating layer 106 provided between the cathode ED3 and the antenna electrode 502 constitute the antenna, and the antenna serves to receive an antenna signal received through a wireless communication network or output an antenna signal transmitted from the antenna driver 700 to the wireless communication network.

The antenna electrode 502 is provided on the top of the cathode ED3, the insulating layer 106 is provided between the cathode ED3 and the antenna electrode 502, and the cathode ED3 and the antenna electrode 502 form the antenna.

The encapsulation layer 504 is provided on the antenna electrode 502.

The encapsulation layer 504 may prevent oxygen or moisture from penetrating into the light emitting device ED provided in the pixel array layer 104. The encapsulation layer 504 may include at least one inorganic layer. In addition, the encapsulation layer 504 may include a plurality of inorganic layers and organic layers provided between the plurality of inorganic layers.

The inorganic layer may serve to block penetration of water or oxygen and may be formed of an inorganic material such as silicon nitride, aluminum nitride, zirconium nitride, titanium nitride, hafnium nitride, tantalum nitride, silicon oxide, aluminum oxide, or titanium oxide, or the like.

The organic layer may be formed to have a relatively thicker than the inorganic layer so as to cover foreign objects that may occur during a manufacturing process. The organic layer may be formed of an organic material such as silicon oxycarbon (SiOCz) acryl or epoxy-based resin. The organic layer may be formed by a coating process, for example, an inkjet coating process or a slit coating process.

The touch screen TS is provided on the encapsulation layer 504. The touch screen TS may be configured according to a self-capacitance method or according to a mutual-capacitance method.

When the touch screen TS is configured according to the self-capacitance method, the touch driver 600 supplies a touch driving signal to each of electrode patterns EP constituting the touch screen TS and receives a touch sensing signal from each of the electrode patterns EP.

When the touch screen TS is configured according to the mutual-capacitance method, the touch driver 600 sequentially applies a touch driving signal to each of the touch driving electrodes formed by the electrode patterns EP constituting the touch screen TS, and receives touch sensing signals respectively from the touch sensing electrodes formed by the electrode patterns EP constituting the touch screen TS.

In this case, as illustrated in FIG. 2, the electrode pattern EP may be formed in a rhombus shape within the display area AA and may be formed in a triangular shape in an area of the display area AA adjacent to the non-display area NAA. However, the shape of the electrode pattern EP may be variously changed. The electrode pattern EP may constitute the touch driving electrode or may constitute the touch sensing electrode in a touch screen configured according to the mutual-capacitance method. In addition, the electrode pattern EP may be one independent touch electrode in a touch screen configured according to the self-capping method. In the following description of other drawings, the feature may be applied in the same scheme.

Hereinafter, for convenience of explanation, a touch screen TS using the mutual-capacitance method will be described as an example of the present disclosure. However, the present disclosure may also be applied to a touch screen TS using the self-capacitance method.

The passivation layer 524 covers the touch screen TS. The passivation layer 524 may be formed of an inorganic material, for example, silicon oxide (SiOx) or silicon nitride (SiNx).

As described above, the touch screen TS and the antenna electrode 502 are provided on different layers, and the antenna electrode 502 is provided between the pixel array part 510 and the touch screen TS.

Here, a portion of the touch screen TS corresponding to the light emitting device ED is open. Hereinafter, the open portion corresponding to the light emitting device is referred to as an open area OPA.

That is, in the present disclosure, in order to prevent the intensity of light output from the light emitting device ED from being reduced by the touch screen TS, the portion corresponding to the light emitting device ED is open. In other words, in order to prevent the antenna signal emitted from the antenna electrode 502 from being blocked by the touch screen TS or the antenna signal received from the outside from being blocked by the touch screen TS, the portion of the touch screen TS corresponding to the light emitting device ED of the touch screen TS is open.

In the present disclosure, the substrate 102, the pixel array layer 104, and the insulating layer 106 constitute the pixel array part 100, and the antenna electrode 502, the encapsulation layer 504, the touch screen TS, and the passivation layer 524 constitute the electrode array part 500.

That is, the display panel 10 includes the pixel array part 100 including the pixels 110 and the electrode array part 500 provided on the pixel array part 100 and including the touch screen TS and the antenna electrode 502.

The electrode array part 500 may be divided into an antenna array part 510 and a touch array part 520.

That is, the electrode array part 500 includes the antenna array part 510 including the antenna electrode 502 and the touch array part 520 including the touch screen TS. The antenna array part 510 is provided on the pixel array part 100 and the touch array part 520 is provided on the antenna array part 510.

The touch screen TS includes the electrode patterns EP as shown in FIG. 2. In this case, each of the electrode patterns EP covers at least two pixels. Sizes of the electrode patterns EP may be variously set according to a touch object (finger or pen), touch sensitivity, the number of coordinates to be sensed, and the like.

As described above, the portion of the touch screen TS corresponding to the light emitting device ED is open, and in particular, a portion of the electrode pattern EP corresponding to the light emitting devices EDs provided in the at least two pixels covered by the electrode pattern EP is open. For example, in FIG. 3, the light emitting devices ED may be distinguished by a bank 108, and an electrode pattern line 522 constituting the electrode pattern EP is formed in an area corresponding to the bank 108, and an area of the electrode pattern EP corresponding to the light emitting device ED is an open area OPA. That is, one electrode pattern EP includes a plurality of open areas OPA and a plurality of electrode pattern lines 522 that distinguish between the open areas OPA as shown in FIG. 2.

In other words, the touch screen TS and the antenna electrode 502 are provided on different layers, and the antenna electrode 502 is provided between the pixel array part 100 and the touch screen TS. In addition, the antenna electrode 502 is provided in the portion of the touch screen TS corresponding to the light emitting device ED, that is, in the open area OPA.

That is, as illustrated in FIG. 2, since the antenna electrode 502 is provided in the entirety of the display area AA of the display panel 10 in the form of a plate, the antenna electrode 502 may be provided in the open area OPA.

When the touch screen TS is configured using the mutual scheme, the touch screen TS includes driving electrodes and reception electrodes. In FIG. 2, the touch screen TS including three driving electrodes and four reception electrodes is shown as an example of the present disclosure. The number of the driving electrodes and the number of the reception electrodes may be variously set according to the size of the display panel 10 or the like.

Each of the driving electrodes includes driving electrode patterns extending in a first direction of the display panel 10 among the electrode patterns EP. For example, in FIG. 2, the driving electrode patterns constituting the first driving electrode are denoted by TX1, the driving electrode patterns constituting the second driving electrode are denoted by TX2, and the driving electrode patterns constituting the third driving electrode are denoted by TX3. The first direction may be a lengthwise direction in FIG. 2 and may be parallel to the data line DL in FIG. 1.

The driving electrode patterns constituting the first driving electrode are electrically connected to each other by first driving electrode bridges, the driving electrode patterns constituting the second driving electrode are electrically connected to each other by second driving electrode bridges, and the driving electrode patterns constituting the third driving electrode are electrically connected to each other by third driving electrode bridges.

Each of the reception electrodes includes reception electrode patterns extending in a second direction different from the first direction among the electrode patterns EP. For example, in FIG. 2, the reception electrode patterns constituting the first reception electrode are denoted by RX1, the reception electrode patterns constituting the second reception electrode are denoted by RX2, the reception electrode patterns constituting the third reception electrode are denoted by RX3, and the reception electrode patterns constituting the fourth reception electrode are denoted by RX4. The second direction may be a widthwise direction in FIG. 2 and may be parallel to the gate line GL in FIG. 1.

The reception electrode patterns constituting the first reception electrode are electrically connected to each other by the first reception electrode bridges, the reception electrode patterns constituting the second reception electrode are electrically connected to each other by the second reception electrode bridges, the reception electrode patterns constituting the third reception electrode are electrically connected to each other by the third reception electrode bridges, and the reception electrode patterns constituting the fourth reception electrode are electrically connected to each other by the fourth reception electrode bridges.

In this case, although the touch screen TS is shown as a single layer on the top of the encapsulation layer 504 in FIGS. 2 and 3, the reception electrode patterns, the driving electrode patterns, the reception electrode bridges, and the driving electrode bridges may be configured as a plurality of layers including at least one insulating layer.

The first driving electrode to the third driving electrode are connected to the touch driver 600 by first driving electrode line to third driving electrode lines TXL1, TXL2, and TXL3, respectively, and the first reception electrode to the fourth reception electrode are connected to the touch driver 600 by the first reception electrode line to the fourth reception electrode lines RXL1, RXL2, RXL3, and RXL4, respectively.

Figure 4:
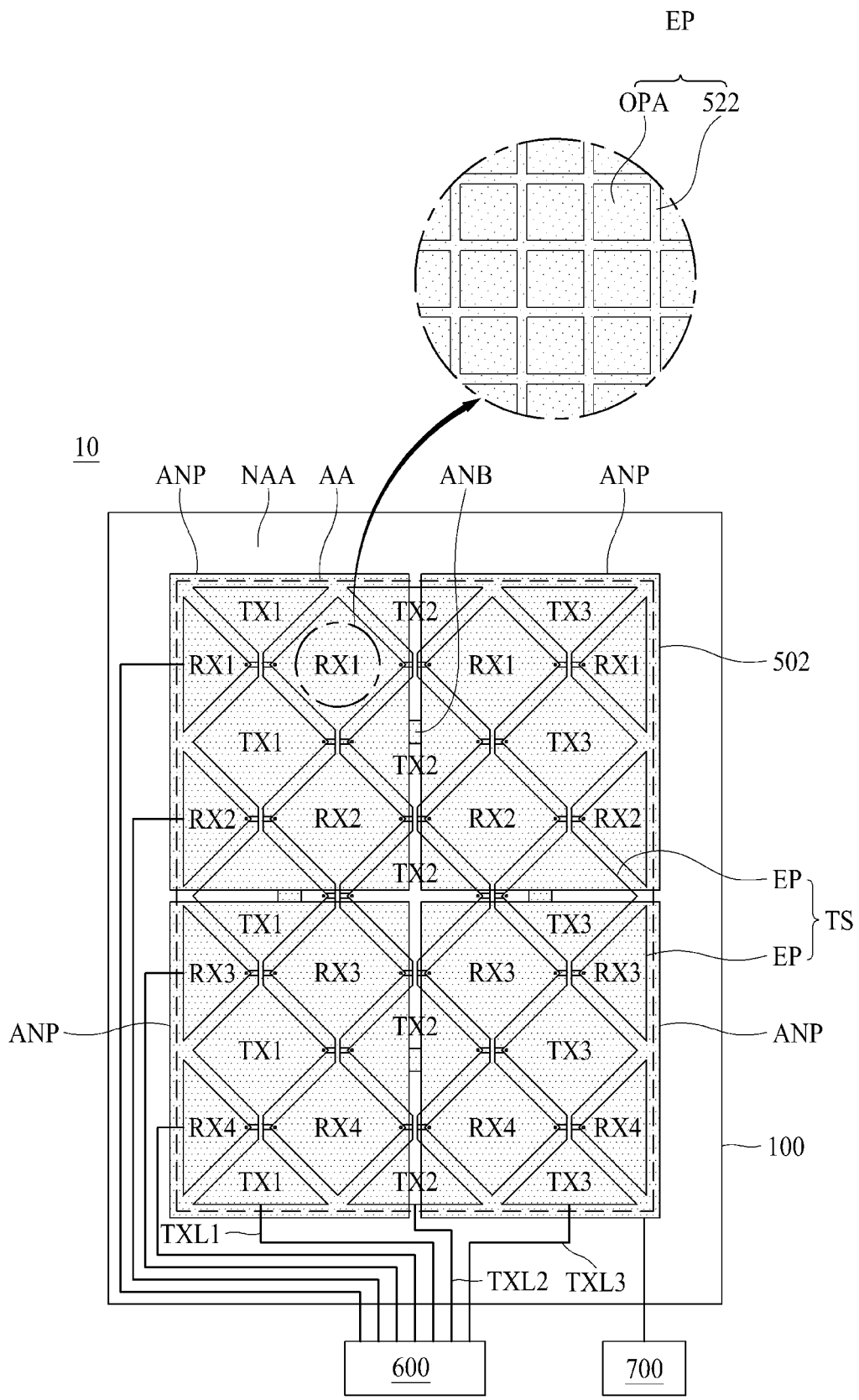
FIGS. 4 to 6 are another exemplary views showing a planar structure of a display panel applied to a display apparatus with an integrated antenna according to an embodiment of the present disclosure.
Figure 5:
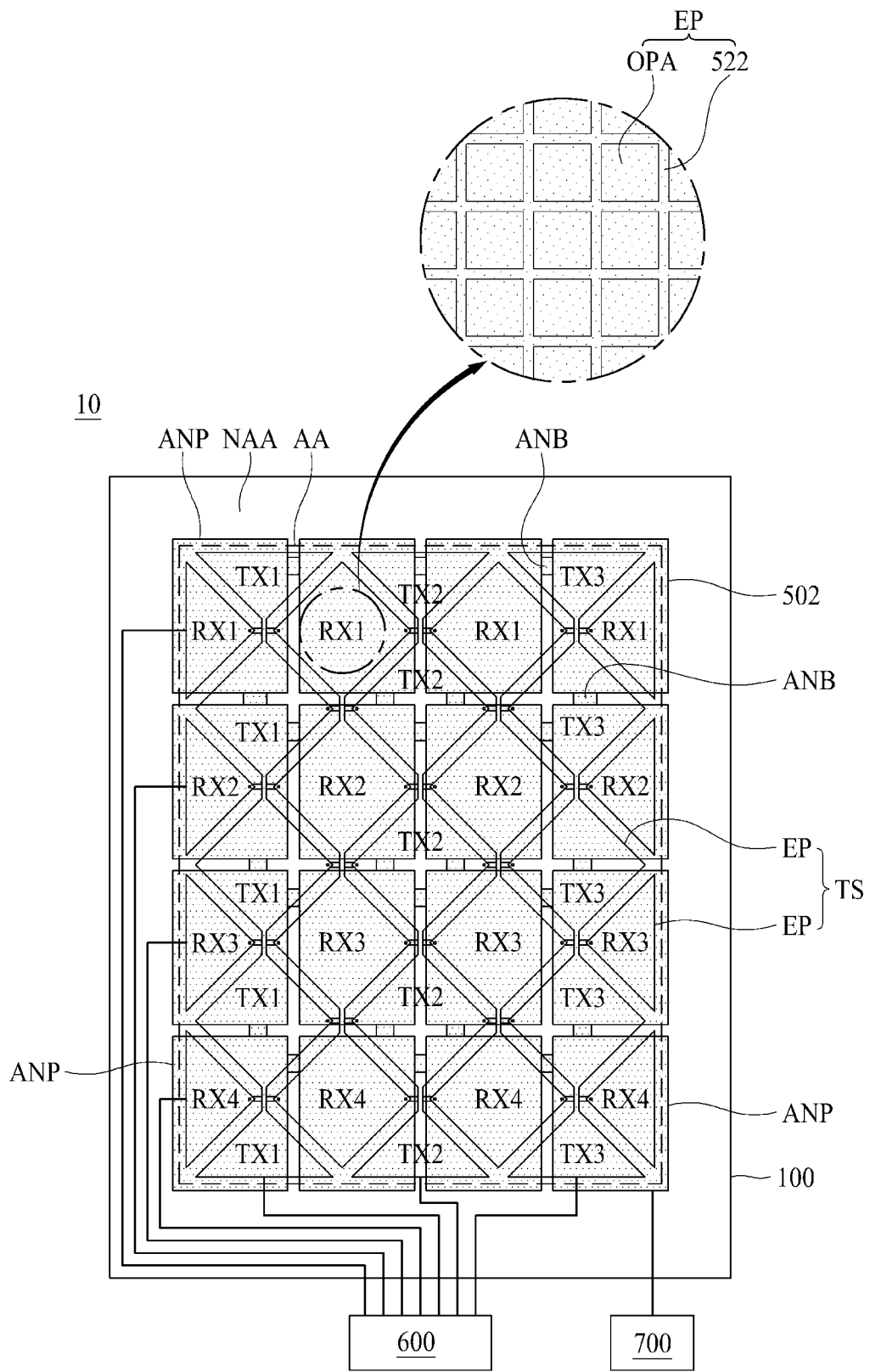
Figure 6:
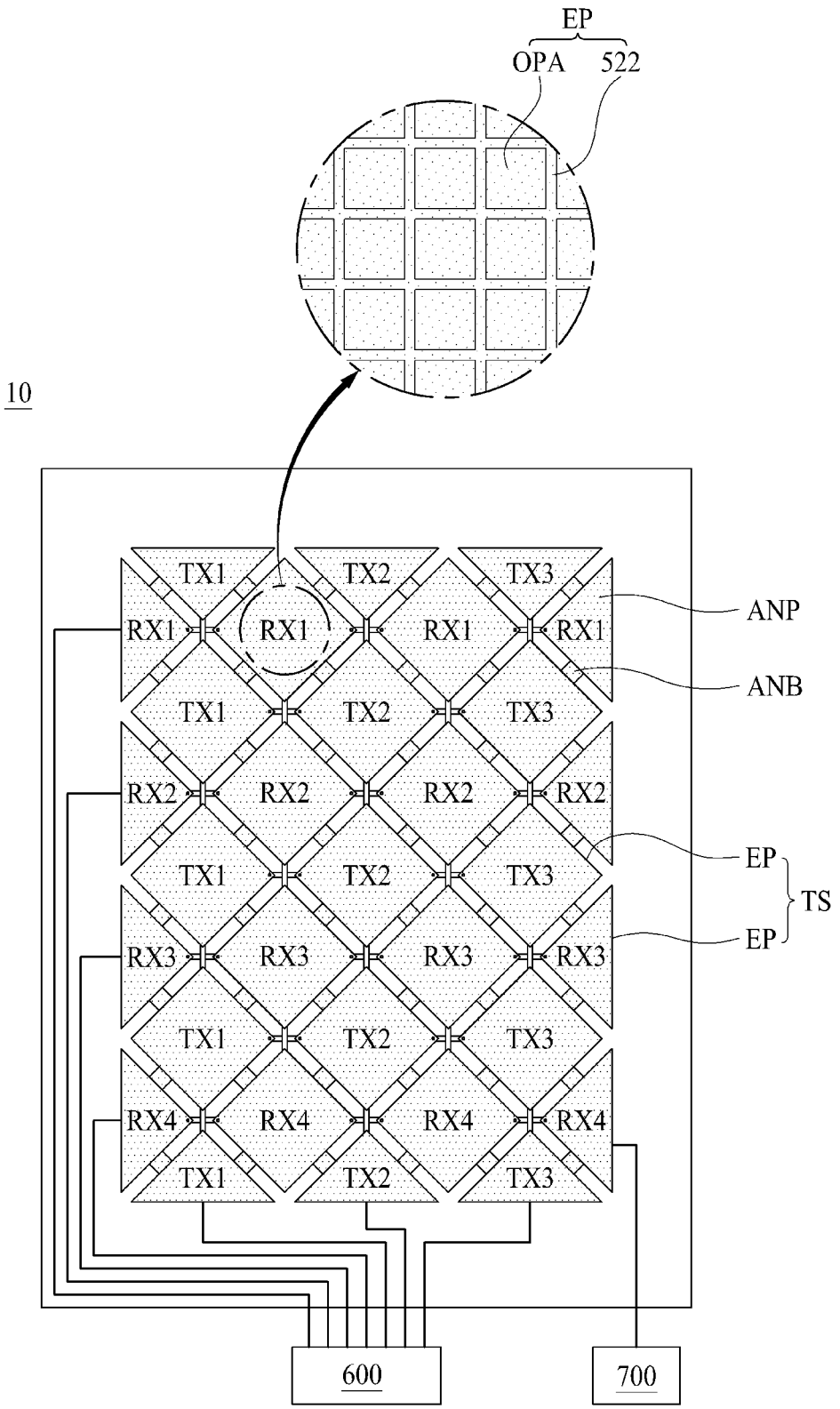

FIGS. 4 to 6 are views showing another example of a planar structure of a display panel applied to the display apparatus with an integrated antenna according to an embodiment of the present disclosure. In the following description, the same or similar contents as those described with reference to FIGS. 1 to 3 are omitted or briefly described.

As described above, the display panel 10 includes the pixel array part including the pixels 110 and the electrode array part 500 provided on the pixel array part 100 and including the touch screen TS and the antenna electrode 502. The electrode array part 500 includes the antenna array part 510 provided on the pixel array part 100 and including the antenna electrode 502 and the touch array part 520 provided on the antenna array part 510 and including the touch screen TS.

The touch screen TS and the antenna electrode 502 are provided on different layers and the antenna electrode is provided between the pixel array part 100 and the touch screen TS.

In this case, the antenna electrode 502 may be formed in a single plate shape and may be provided on the entire surface of the display area AA as shown in FIG. 2, and may include at least two antenna patterns ANP as shown in FIG. 6.

For example, FIG. 4 illustrates an antenna electrode 502 including four antenna patterns ANP, and FIG. 5 illustrates an antenna electrode 502 including 16 antenna patterns ANP.

In particular, FIG. 6 illustrates an antenna electrode 502 including antenna patterns ANP separated in the same form as the electrode patterns EP.

In addition, the antenna patterns ANP may be formed in various shapes such as a square, a hexagon, an octagon, and a circle.

In this case, the antenna patterns ANP may be electrically connected through antenna bridges ANB and connected to the antenna driver 700.

That is, the touch screen TS is driven by the touch driver 600, and the antenna electrode 502 is driven by the antenna driver 700.

In particular, in the present disclosure as described above, the touch driver 600 and the antenna driver 700 are independently driven. That is, the process of determining whether the display panel 10 is touched by the touch driver 600 is not affected by the process of outputting or receiving an antenna signal by the antenna driver 700 using the antenna electrode 502.

Generally, since the antenna is a passive element, an output compared with an input is reduced, and therefore it is necessary to secure an antenna gain through a low-resistance wiring. In addition, the characteristics of the antenna are affected not only by resistance but also by capacitance between a ground metal and the antenna electrode. In particular, in order to form a highly efficient antenna, a low dielectric constant material must be applied and the size of the antenna is also determined according to a magnitude of capacitance.

According to the present disclosure, since the cathode ED3 provided on the entire surface of the display panel may be used as a ground electrode of the antenna, capacitance of the antenna may be increased, thereby improving performance of the antenna.

In general, as the antenna electrode is divided into a plurality of antenna patterns, performance of the antenna may be improved. According to the present disclosure, since the shape of the antenna electrode 502 does not affect the touch screen TS and other elements, the antenna electrode 502 may be divided into various types of antenna patterns ANP as shown in FIGS. 4 to 6, and thus, performance of the antenna may be improved.

The antenna of the above-described type applied to the present disclosure is referred to as a patch antenna. The patch antenna uses a method of supplying electricity through a rectangular or circular metal provided on a microstrip substrate. The microstrip substrate may correspond to the cathode ED3 in the present disclosure, and the metal may correspond to the antenna electrode 502.

That is, according to the present disclosure, the patch antenna may be embedded in the display panel 10 together with the touch screen TS, and the performance of the patch antenna may be improved.

Figure 7:
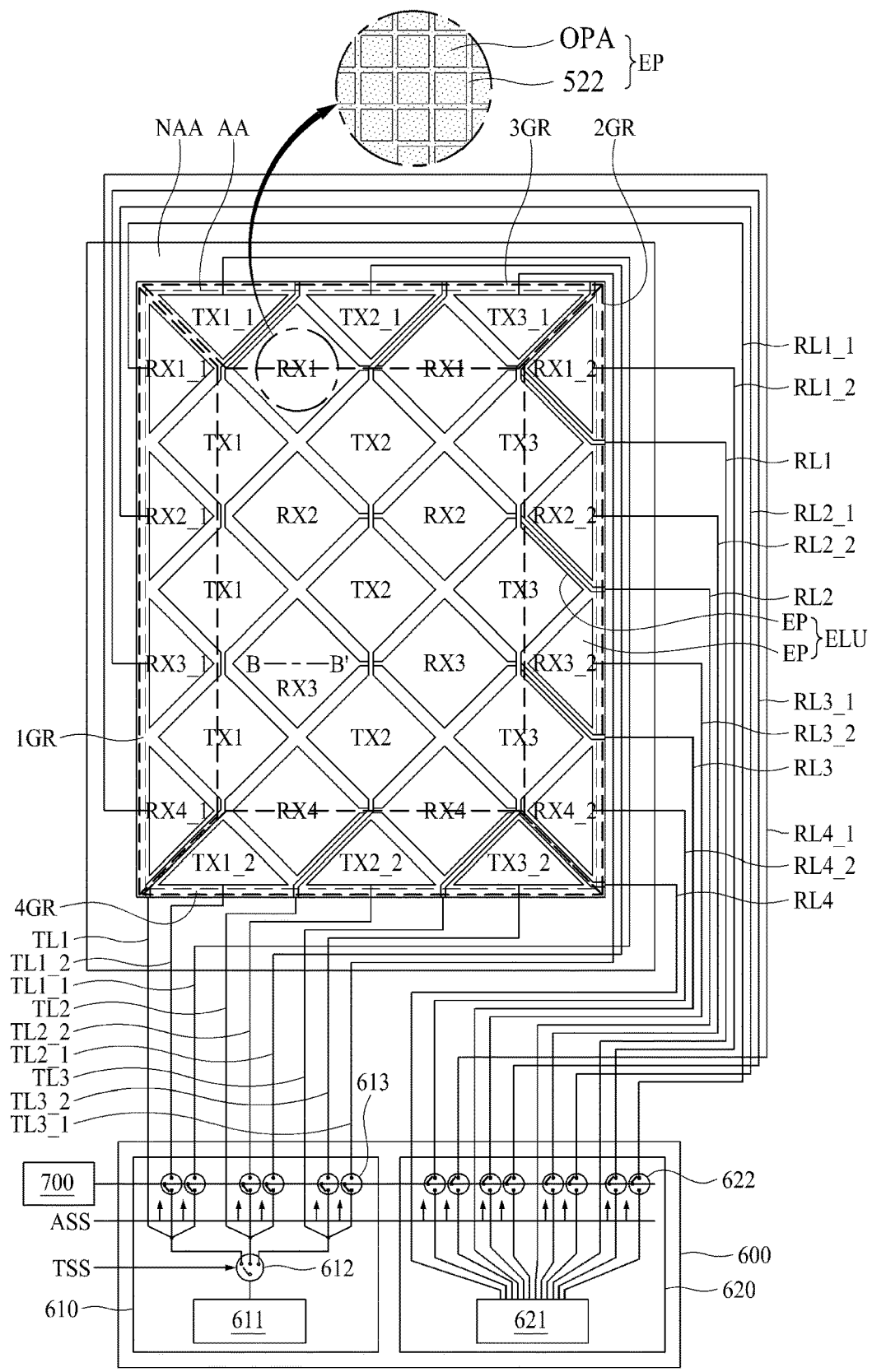
FIG. 7 is another exemplary view showing a planar structure of a display panel applied to the display apparatus with an integrated antenna according to an embodiment of the present disclosure.
Figure 8:
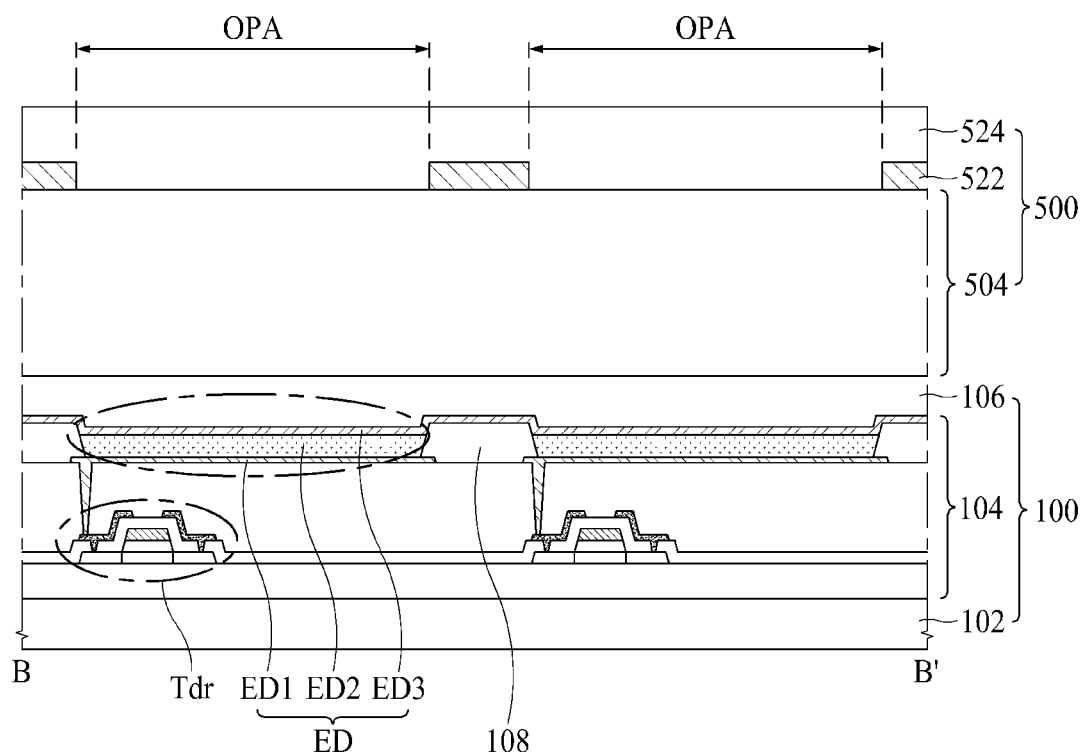
FIG. 8 is a cross-sectional view taken along line B-B' in FIG. 7 according to an embodiment of the present disclosure.
Figure 9:
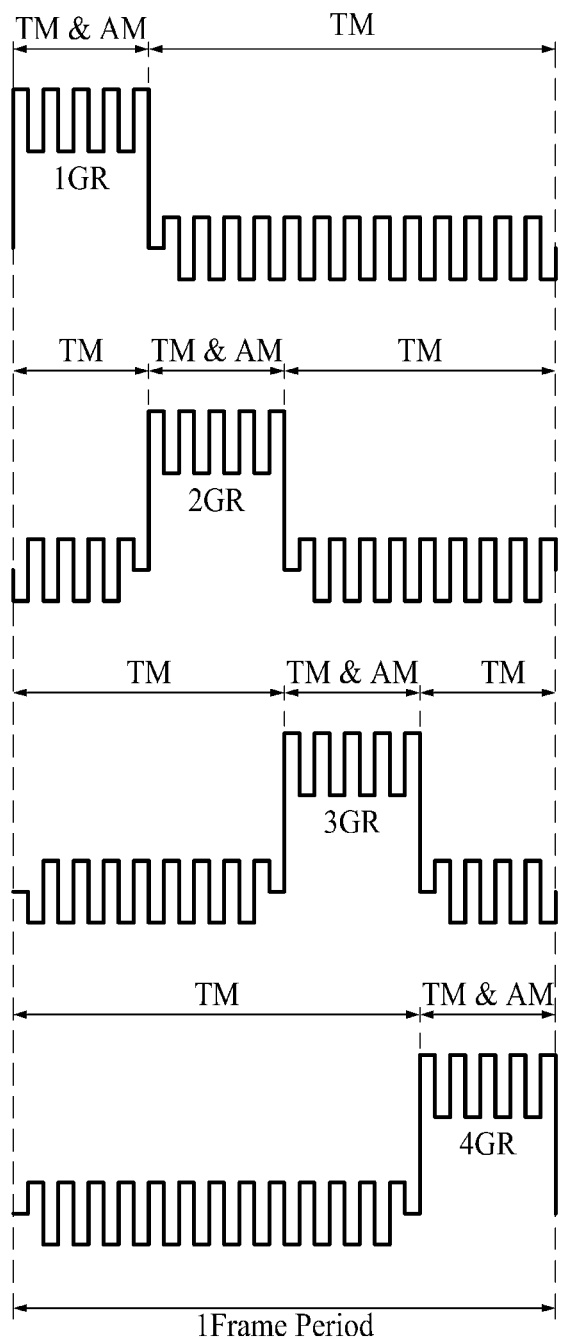
FIG. 9 is a view illustrating an example of an operation method of a touch mode and an antenna mode applied to an embodiment of the present disclosure.
Figure 10:
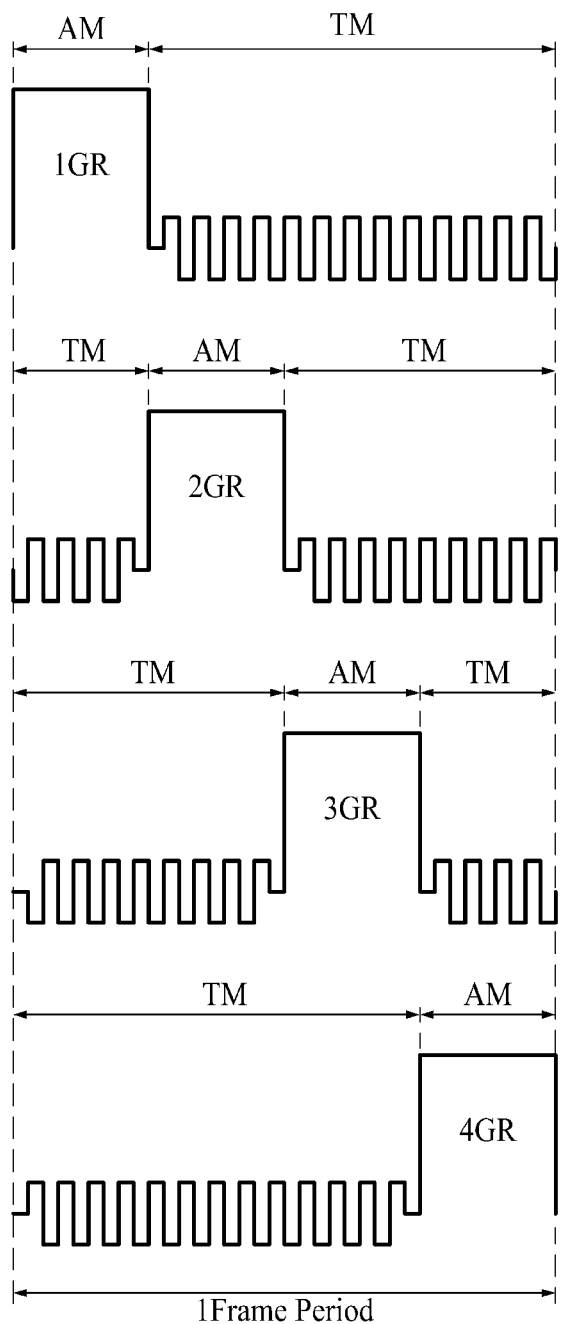
FIG. 10 is a view illustrating another example of an operation method of a touch mode and an antenna mode according to an embodiment of the present disclosure.

FIG. 7 is a view illustrating another example of a planar structure of a display panel applied to a display apparatus with an integrated antenna according to an embodiment of the present disclosure, FIG. 8 is a cross-sectional view taken along line B-B' of FIG. 7 according to an embodiment of the present disclosure, FIG. 9 is a view illustrating an operation method of a touch mode and an antenna mode according to an embodiment of the present disclosure, and FIG. 10 is a view illustrating another example of an operation method of a touch mode and an antenna mode applied to an embodiment of the present disclosure. Since the line B-B' in FIG. 7 extends over two pixels, the cross-section of the two pixels is shown in FIG. 8. In the following description, the same or similar contents as those described with reference to FIGS. 1 to 6 are omitted or briefly described.

A display apparatus with an integrated antenna according to the present disclosure includes a display panel 10 including a touch screen and an antenna electrode, a gate driver 200 transmitting scan signals to gate lines GL1 to GLg provided in the display panel 10, a data driver 300 supplying data voltages to the data lines DL1 to DLd provided in the display panel 10, a controller 400 controlling the gate driver 200 and the data driver 300, an antenna driver 700 transmitting an antenna signal transmitted from an external system to a wireless communication network via the antenna electrode or transmitting an antenna signal received from the antenna electrode to the external system, and a touch driver 600 driving the touch screen.

As described above, the display panel 10 includes the pixel array part 100 including the pixels 110 and the electrode array part 500 provided on the pixel array part 100 and including the touch screen and the antenna electrode.

The display area includes a pixel including a pixel driving circuit and a light emitting device, and a portion of the touch screen corresponding to the light emitting device is open. Here, the portion of the touch screen corresponding to the light emitting device ED is open. Hereinafter, the open portion corresponding to the light emitting device is referred to as an open area OPA.

In particular, the electrode array part 500 may be used as the touch screen or as the antenna. In addition, the entirety of the electrode array part 500 may be used as the touch screen or as the antenna.

A portion of the electrode array part 500 corresponding to the light emitting device ED is open and a portion of the electrode patterns EP constituting the electrode array part 500 corresponding to the light emitting device ED provided in at least two pixels covered by the electrode pattern EP is open. For example, in FIG. 8, the light emitting devices ED may be distinguished by the bank 108, an area corresponding to the bank 108 includes the electrode pattern line 522 constituting the electrode pattern EP, and an area of the electrode pattern EP corresponding to the light emitting device ED is the open area OPA.

As shown in FIGS. 7 and 8, the electrode array part 500 includes an encapsulation layer 504 provided on the pixel array part, an electrode unit ELU provided on the encapsulation layer 504, and a passivation layer 524 covering the electrode unit ELU, and the electrode unit ELU is used as at least one of the touch screen and the antenna electrode.

The light emitting device ED includes an anode electrode ED1, a light emitting layer ED2 provided on the anode electrode ED1, and a cathode ED3 provided on the light emitting layer ED2. The cathode ED3 is provided on the entire display area AA, and the electrode patterns EP included in the at least one antenna area and the cathode ED3 form an antenna.

Here, compared with the present disclosure described with reference to FIGS. 2 to 6, a difference of the present disclosure described with reference to FIGS. 7 and 8 is that, in the display panel 10 shown in FIGS. 7 and 8, some of the electrode patterns EP is used as the touch screen and the other is used as the antenna electrode. In the display panel 10 shown in FIGS. 7 and 8, all of the electrode patterns EP may be used as the touch screen or may be used as the antenna electrode.

In other words, in the display panel 10 described with reference to FIGS. 2 to 6, although the electrode patterns EP are used only as the touch screen, the display panel 10 shown in FIGS. 7 and 8, the electrode patterns EP may be used as the touch screen and the antenna electrode.

Thus, in the description of FIGS. 2 to 6, the electrode patterns EP constitute the touch screen TS, but, in the description of FIGS. 7 to 10, the electrode patterns EPs constitute the electrode unit ELU. That is, the electrode unit ELU may be used as the touch screen and the antenna electrode.

The electrode unit ELU includes the electrode patterns EP and the electrode patterns EP include external patterns RX1_1, RX1_2, RX2_1, RX2_2, RX3_1, RX3_2, RX4_1, RX4_2, TX1_1, TX1_2, TX2_1, TX2_2, TX3_1, and TX3_2 adjacent to the non-display area NAA and internal patterns TX1, TX2, TX3, RX1, RX2, RX3, and RX4 surrounded by the external patterns.

The external patterns are used as the touch screen in the touch mode and as the antenna electrode in the antenna mode.

However, the internal patterns may also be used as the antenna electrode in the antenna mode. Hereinafter, for convenience of explanation, a display panel in which only the external patterns are used as the touch screen or the antenna electrode will be described as an example of the present disclosure.

In this case, the external patterns may be divided into at least two antenna areas.

In the antenna mode, external patterns constituting any one of the at least two antenna areas are used as the antenna electrode, and external patterns constituting the remaining antenna area may be used as the touch screen.

Also, when another antenna mode arrives after the antenna mode, the external patterns constituting the remaining antenna area of the at least two antenna areas are used as the antenna electrode, and the external patterns that constitute the any one antenna area may be used as the touch screen.

That is, in the present disclosure, the external patterns may be divided into at least two antenna areas, and the antenna areas may alternately be used as an antenna electrode. In particular, FIG. 7 shows the display panel 10 in which the external patterns are divided into four antenna areas as an example of the present disclosure.

For example, as shown in FIG. 7, among the external patterns, the external patterns RX1_1, RX2_1, RX3_1, and RX4_1 provided on a first side of the display area AA may form a first antenna group 1GR, external patterns RX1_2, RX2_2, RX3_2 and RX4_2 provided on a second side of the display area AA facing the first side may form a second antenna group 2GR, external patterns TX1_1, TX2_1, and TX3_1 provided between the first side and the second side of the display area AA may form a third antenna group 3GR, and external patterns TX1_2, TX2_2, and TX3_2 provided on a fourth side of the display area AA facing the third side may form a fourth antenna group 4GR.

Here, the first side may refer to a left side of the display panel shown in FIG. 7, the second side may refer to a right side of the display panel, the third side may refer to the top of the display panel, and the fourth side may refer to the bottom of the display panel. In the above example, as illustrated in FIG. 9, the touch driver 700 uses all of the electrode patterns as the touch screen in the touch mode TM and connects at least one of the first to fourth antenna groups 1GR to 4GR to the antenna driver 700 in the antenna mode AM. That is, in the touch mode TM, all the electrode patterns EP are used as the touch screen, and in the antenna mode AM, electrode patterns EP included in at least one of the first to fourth antenna groups 1GR to 4GR may be used as the antenna electrode.

For example, as shown in FIG. 9, in a first antenna mode AM of one frame period, the external patterns constituting the first antenna group 1GR are used as the antenna electrode, in a second antenna mode AM, the external patterns constituting the second antenna group 2GR are used as the antenna electrode, in a third antenna mode AM, the external patterns constituting the third group 3GR are used as the antenna electrode, and in a fourth antenna mode AM, the external patterns constituting the fourth group 4GR are used as the antenna electrode.

In this case, while each of the first to fourth groups 1GR to 4GR is used as an antenna electrode, that is, in the first antenna mode AM, the second antenna mode AM, the third antenna mode AM, and the fourth antenna mode AM, the remaining antenna patterns are not driven.

During a period other than the antenna mode AM in the one frame period, that is, in the touch mode TM, all the electrode patterns are used as the touch screen.

In other words, in the antenna mode AM, an antenna function is performed by at least one of the first to fourth groups 1GR to 4GR and the touch function is not performed. Also, in the touch mode TM, all the electrode patterns EP are used as a touch screen.

In the touch mode TM, as shown in FIG. 9, a plurality of touch driving signals are supplied to the electrode patterns EP, so that a touch may be detected.

However, the antenna mode AM may be concurrent with the touch mode TM.

For example, as shown in FIG. 10, the touch mode TM for touch sensing may occur in all the periods of one frame period, and the antenna mode AM for transmitting and receiving an antenna signal may occur in a part of one frame period.

In this case, transmission and reception of the antenna signal may be performed using signals having an amplitude larger than the touch driving signals, as shown in FIG. 10. That is, in order to prevent interference between the antenna signal and the touch driving signal, the antenna signal may have an amplitude larger than the touch driving signal.

In other words, as shown in FIG. 10, in one frame period, touch sensing may be continuously performed, and the antenna signal may be transmitted and received only during a part of one frame period. Here, electrode patterns EP included in at least one of the first to fourth antenna groups 1GR to 4GR may be used as the antenna electrode in a part of the one frame period.

However, if all of the first to fourth antenna groups 1GR to 4GR are sequentially driven during the one frame period, the antenna mode AM may also continuously occur substantially in the one frame period. Therefore, the transmitting and receiving function of the antenna signal may be improved.

In other words, in a case where the electrode patterns EP are divided into the shapes shown in FIG. 7, the internal patterns TX1, TX2, TX3, RX1, RX2, RX3, and RX4, may be used as a touch screen during one frame period. Therefore, whether the display panel 10 is touched may be continuously determined during the one frame period.

In this case, only the first antenna group 1GR among the first to fourth antenna groups 1GR to 4GR may be used as the antenna electrode during a ¼ of one frame period, only the second antenna group 2GR may be used as the antenna electrode during another ¼ period, only the third antenna group 3RG may be used as the antenna electrode during another ¼ period, and only the fourth antenna group 4RG may be used as the antenna electrode during the remaining ¼ period.

Also, during ¼ of the one frame period, all of the first to fourth antenna groups 1GR to 4GR may be used as the antenna electrode. However, in this case, since all of the external patterns are used as antenna electrode, touch sensitivity of the touch screen may be reduced. Therefore, in the display panel that does not require high touch sensitivity, all of the external patterns may be used as the antenna electrode during a part of one frame period.

That is, in the present disclosure, the antenna groups may be set in various numbers and types, and the number and positions of antenna groups driven in the antenna mode may also be variously set. Hereinafter, for the convenience of explanation, a display panel in which only the external patterns are used as the touch screen or the antenna electrode, the external patterns are divided into first to fourth antenna groups 1GR to 4GR as illustrated in FIG. 7, and the first to fourth antenna groups 1GR to 4GR operate in the form shown in FIG. 10 will be described as an example of the present disclosure.

In order to perform the function described above, as shown in FIG. 7, the touch driver 600 includes a driving signal supply part 610 sequentially transmitting touch driving signals to the driving electrodes and a touch sensing part 620 receiving a touch sensing signal from the reception electrodes and determining whether a touch is applied.

Each of the driving electrodes includes driving electrode patterns extending in the first direction of the display panel 10 among the electrode patterns EP.

For example, in FIG. 7, driving electrode patterns constituting the first driving electrode are denoted by TX1, driving electrode patterns constituting the second driving electrode are denoted by TX2, and driving electrode patterns constituting the third driving electrode are denoted by TX3.

The driving electrode patterns constituting the first driving electrode are electrically connected to each other by the first driving electrode bridges, the driving electrode patterns constituting the second driving electrode are electrically connected to each other by the second driving electrode bridges, the driving electrode patterns constituting the third driving electrode are electrically connected to each other by the third driving electrode bridges.

A driving electrode pattern TX1_1 provided on the third side among the driving electrode patterns constituting the first driving electrode, a driving electrode pattern TX2_1 provided on the third side among the driving electrode patterns constituting the second driving electrode, and a driving electrode pattern TX3_1 provided on the third side among the driving electrode patterns constituting the third driving electrode are external patterns included in the third antenna group 3RG.

A driving electrode pattern TX1_2 provided on the fourth side among the driving electrode patterns constituting the first driving electrode, a driving electrode pattern TX2_2 provided on the fourth side among the driving electrode patterns constituting the second driving electrode, and a driving electrode pattern TX3_2 provided on the fourth side among the driving electrode patterns constituting the third driving electrode are external patterns included in the fourth antenna group 3RG.

Driving electrode patterns excluding the two external patterns provided on the third side and the fourth side among the driving electrode patterns constituting the first driving electrode are internal patterns, driving electrode patterns excluding the two external patterns provided on the third side and the fourth side among the driving electrode patterns constituting the second driving electrode are internal patterns, and driving electrode patterns excluding the two external patterns provided on the third side and the fourth side among the driving electrode patterns constituting the third driving electrode are internal patterns.

In this case, the internal patterns among the driving electrode patterns constituting the first driving electrode are connected to the driving signal supply part 610 through the first internal pattern line TL1, the external pattern provided on the third side is connected to the driving signal supply part 610 through the (1_1)th external pattern line TL1_1 provided on the third side, and the external pattern provided on the fourth side is connected to the driving signal supply part 610 through the (1_2)th external pattern line TL1_2.

The driving electrode patterns constituting the second driving electrode are also connected to the driving signal supply part 610 through the second internal pattern line TL2, the (2_1)th external pattern line TL2_1, and the (2_2)th external pattern line TL2_2.

The driving electrode patterns constituting the third driving electrode are also connected to the driving signal supply part 610 through the third internal pattern line TL3, the (3_1)th external pattern line TL3_1, and the (3_2)th external pattern line TL3_2.

Each of the reception electrodes includes reception electrode patterns extending in the second direction different from the first direction among the electrode patterns EP.

For example, in FIG. 7, the reception electrode patterns constituting the first reception electrode are denoted by RX1, the reception electrode patterns constituting the second reception electrode are denoted by RX2, the reception electrode patterns constituting the third reception electrode are denoted by RX3, and the reception electrode patterns constituting the fourth reception electrode are denoted by RX4.

The reception electrode patterns constituting the first reception electrode are electrically connected to each other by first reception electrode bridges, the reception electrode patterns constituting the second reception electrode are electrically connected to each other by second reception electrode bridges, the reception electrode patterns constituting the third reception electrode are electrically connected to each other by the third reception electrode bridges, and the reception electrode patterns constituting the fourth reception electrode are electrically connected to each other by the fourth reception electrode bridges.

Each of the first to fourth reception electrodes may be classified into internal patterns and external patterns similarly to the first to third driving electrodes.

In this case, the internal patterns among the reception electrode patterns constituting the first reception electrode are connected to the touch sensing part 620 through the first internal pattern line RL1, the external pattern provided on the first side is connected to the touch sensing part 620 through the (1_1)th external pattern line RL1_1, and the external pattern provided on the second side is connected to the touch sensing part 620 through the (1_2)th external pattern line RL1_2.

The reception electrode patterns constituting the second reception electrode are also connected to the touch sensing part 620 through the second internal pattern line RL2, the (2_1)th external pattern line RL2_1. and the (2_2)th external pattern line RL2_2.

The reception electrode patterns constituting the third reception electrode are also connected to the touch sensing part 620 through the third internal pattern line RL3, the (3_1)th external pattern line RL3_1, and the (3_2)th external pattern line RL3_2.

The reception electrode patterns constituting the fourth reception electrode are also connected to the touch sensing part 620 through the fourth internal pattern line RL4, the (4_1)th external pattern line RL4_1, and the (4_2)th external pattern line RL4_2.

In the touch mode, a touch driving signal is sequentially supplied to the first to third driving electrodes. That is, after the touch driving signal is supplied to the first driving electrode in the touch mode, the touch driving signal is supplied to the second driving electrode, and finally, the touch driving signal is supplied to the third driving electrode.

In the antenna mode, external patterns constituting the first to third driving electrodes must be connected to the antenna driver 700.

The driving signal supply part 610 includes a first driving switch 612 for sequentially supplying the touch driving signal to the first to third driving electrodes, a second driving switch 613 for connecting the external patterns constituting the first to third driving electrodes to the antenna driver 700, and a touch driving signal generating unit 611 for outputting the touch driving signal to the first driving switch 612.

A touch synchronization signal TSS for controlling the first driving switch 612 may be generated by the touch driving signal generating unit 611 or may be transmitted from the controller 400.

An antenna synchronization signal ASS for controlling the second driving switch 613 may be generated by the touch driving signal generating unit 611 or may be transmitted from the controller 400.

The first driving switch 612 connects one of the first to third driving electrodes to the touch drive signal generating unit 611 as shown in FIG. 7.

The second driving switches 613 connect the (1_1)th external pattern line TL1_1, the (1_2)th external pattern line TL1_2, the (2_1)th external pattern line TL2_1, the (2_2)th external pattern line TL2_2, the (3_1)th external pattern line TL3_1, and the (3_2)th external pattern line TL3_2 connected to the driving electrodes to the antenna driver 700 or to the first driving switch 612.

For example, in the touch mode, the second driving switches 613 connect the lines to the first driving switch 612. In this case, the first driving switch 612 sequentially supplies the touch driving signal to the driving electrodes by the touch synchronization signal TSS.

Therefore, in the touch mode, the touch driving signal may be sequentially supplied to the first to third driving electrodes.

In the antenna mode, the second driving switches 613 connect the lines to the antenna driver 700.

In this case, the second driving switches 613 connected to the same antenna group among the second driving switches 613 are simultaneously connected to the antenna driver 700, and the second driving switches 613, are sequentially connected to the antenna driver 700.

Therefore, in the antenna mode, the antenna groups may sequentially perform the function of the antenna electrode.

In the touch mode, the first to fourth reception electrodes are connected to the touch sensing part 620.

In the antenna mode, the external patterns constituting the first to fourth reception electrodes may be connected to the antenna driver 700.

To this end, the touch sensing part 620 includes sensing switches 622 for connecting the external patterns constituting the first to fourth reception electrodes to the antenna driver 700 and a touch determining unit 621 receiving touch sensing signals from the first to fourth reception electrodes and determining whether the display panel 10 is touched.

The antenna synchronization signal ASS for controlling the sensing switches 622 may be generated by the touch determining unit 621 or may be transmitted from the controller 400.

The antenna synchronization signal ASS for controlling the sensing switches 622 may be the same signal as the antenna synchronization signal ASS for controlling the second driving switches 613.

For example, in the touch mode, the sensing switches 622 connect the lines connected to the first to fourth reception electrodes to the touch determining unit 621. In this case, the touch determining unit 621 determines whether the display panel 10 is touched using the touch sensing signals received from the first to fourth reception electrodes.

In the antenna mode, the sensing switches 622 connect the lines connected to the external patterns constituting the first to fourth reception electrodes to the antenna driver 700.

In this case, the sensing switches 622 connected to the same antenna group among the sensing switches 622 are simultaneously connected to the antenna driver 700, and the sensing switches 622 connected to different antenna groups are sequentially connected to the antenna driver 700.

Therefore, in the antenna mode, the antenna groups may sequentially perform the function of the antenna electrode.

In addition, one antenna group may include external patterns connected to the reception electrodes and external patterns connected to the driving electrodes. In this case, the external patterns included in one antenna group must be connected to the antenna driver 700 at the same time. To this end, as described above, the antenna synchronization signal ASS for controlling the sensing switches 622 may be the same signal as the antenna synchronization signal ASS for controlling the second driving switches 613.

As described above, in the present disclosure, the electrode unit ELU is driven in a time division manner so that the electrode unit ELU may be used as a touch screen and an antenna electrode.

Therefore, according to the present disclosure, an antenna signal may be transmitted and received even while it is determined whether the touch is applied.

Further, according to the present disclosure, since the electrode unit ELU provided on the front surface of the display panel 10 may be used as the antenna electrode, the antenna signal may be radiated to the front surface of the display panel 10 or an antenna signal may be received from the front surface of the display panel 10.

Thus, the transmission and/or reception efficiency of the antenna may be increased.

However, as described with reference to FIG. 9, the touch driving signal generating unit 611 may be configured not to output the touch driving signal in the antenna mode AM when at least one of the first to fourth antenna groups 1GR to 4GR is used as an antenna electrode and if the remaining electrode patterns EP are not driven.

Figure 11:
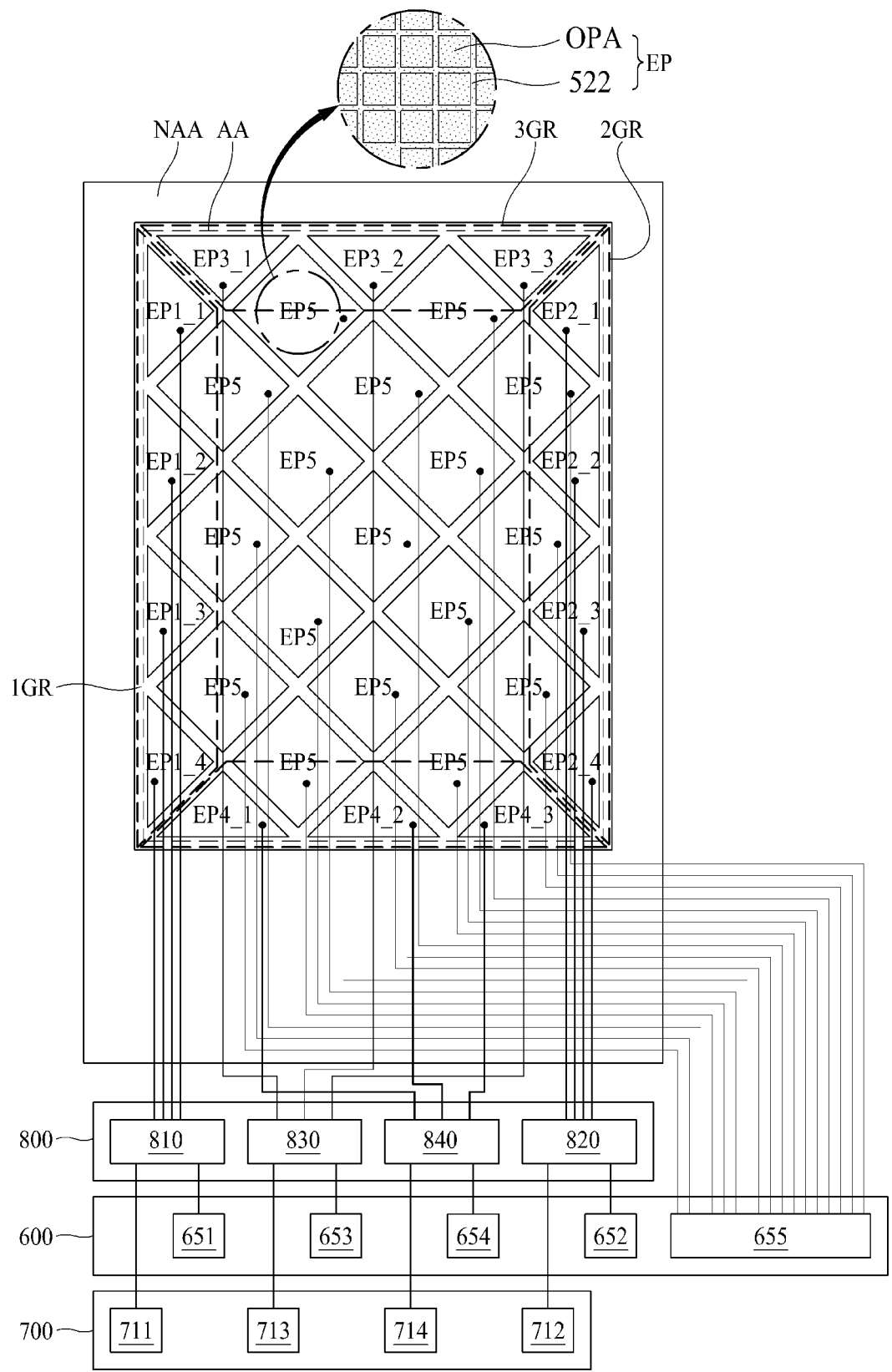
FIG. 11 is another exemplary view showing a planar structure of a display panel applied to the display apparatus with an integrated antenna according to an embodiment of the present disclosure.

FIG. 11 is a view showing another example of a planar structure of a display panel applied to a display apparatus with an integrated antenna according to an embodiment of the present disclosure. In the following description, the same or similar contents as those described with reference to FIGS. 1 to 10 are omitted or briefly described.

As described above with reference to FIG. 2, the electrode pattern EP may be formed in a rhombus shape within the display area AA as shown in FIG. 11 and may be formed in a triangular shape in the area of the display area AA adjacent to the non-display area NAA. Also, as shown in FIG. 11, the electrode pattern EP may be used as one independent touch electrode in a touch screen configured according to the self-capacitance method. In addition, one electrode pattern EP includes a plurality of open areas OPA and a plurality of electrode pattern lines 522 demarcating the open areas OPA as shown in FIG. 11.

The touch screen applied to the display apparatus with an integrated antenna according to the present disclosure may be configured according to the mutual-capacitance method as shown in FIG. 7 or may be configured in the self-capacitance manner as shown in FIG. 11. Each of the electrode patterns EP illustrated in FIG. 11 is denoted by reference numerals such as EP1_1, EP2_1, EP3_1, EP4_1, EP5, or the like. In the following description, when the electrode patterns EP are to be described separately, reference numerals as shown in FIG. 11 are used. And in a case where the electrode patterns EP need not be separately described, reference numeral EP is used.

In this case, the electrode patterns EP shown in FIG. 11 are separated from each other independently, unlike the electrode patterns EP shown in FIG. 7. That is, the electrode patterns EP shown in FIG. 11 are formed to have the same structure as the electrode patterns EP shown in FIG. 7, except that they are separated from each other. Therefore, in the following description, the features of the self-capacitance scheme will be described based on the contents described in FIG. 7.

For example, in the embodiment shown in FIG. 11, the external patterns EP1_1, EP1_2, EP1_3, and EP1_4 included in the first antenna group 1GR, described above with reference to FIG. 7, are connected to a first antenna part 711 or a first touch part 651 through a first switching unit 810, the external patterns EP2_1, EP2_2, EP2_3, and EP2_4 included in the second antenna group 2GR are connected to a second antenna part 712 or a second touch part 652 through a second switching unit 820, the external patterns EP3_1, EP3_2, and EP3_3 included in the third antenna group 3GR are connected to a third antenna part 713 or a third touch part 653 through a third switching unit 830, the external patterns EP4_1, EP4_2, and EP4_3 included in the fourth antenna group 4GR are connected to a fourth antenna part 714 or a fourth touch part 654 through a fourth switching unit 840, and the internal patterns EP5 are connected to a fifth touch part 655. In this case, as described above, each of the external patterns and the internal patterns is not electrically connected, and thus, are independently connected to the first to fifth touch parts 651 to 655.

The first to fourth antenna units 711 to 714 constitute the antenna driver 700 and the first to fifth touch parts 651 to 655 constitute the touch driver 600.

In the touch mode TM, the first to fourth switching units 810 to 840 connect the first to fourth antenna groups 1GR to 4GR to the touch driver 600. In this case, the touch driver 600 supplies a touch driving signal to each of the electrode patterns EP, and then, determines whether the display panel 10 is touched using the touch sensing signals received from each of the electrode patterns EP.

That is, in the touch mode TM, each of the external patterns and each of the internal patterns receives the touch driving signal individually, and each of the touch sensing signals generated by each of the external patterns and each of the internal patterns is also transmitted to the touch driver 600 individually through the first to fifth touch parts 651 to 655.

The touch driver 600 determines whether each of the external patterns and the internal patterns is touched using the touch sensing signals.

In the antenna mode AM, the first to fourth switching units 810 to 840 connect at least one of the first to fourth antenna groups 1GR to 4GR to the antenna driver 700. In this case, the antenna driver 700 may transmit an antenna signal transmitted from the external system 900 to the wireless communication network through at least one of the first to fourth antenna groups 1GR to 4GR or transmit an antenna signal received through at least one of the first to fourth antenna groups 1GR to 4GR to the external system 900.

In the antenna mode AM, the touch driver 600 may not output a touch driving signal.

That is, the antenna mode AM and the touch mode TM may be independently generated as described above with reference to FIG. 9.

However, the antenna mode AM may be generated together with the touch mode TM as described with reference to FIG. 10.

For example, the first to fourth switching units 810 to 840 may connect at least one of the first to fourth antenna groups 1GR to 4GR to the antenna driver 700 and connect the remaining groups to the touch driver 600 in the antenna mode AM. Accordingly, in the antenna mode AM, the touch driving signal may be supplied to the other remaining electrode patterns EP, excluding the electrode patterns included in the antenna group connected to the antenna driver 700.

Accordingly, the function of transmitting and receiving the antenna signal and the function of sensing the touch may be performed at the same time.

According to the present disclosure, since the antenna may be embedded in the display area of the display panel, a narrow bezel may be realized.

Further, according to the present disclosure, since the cathode of the light emitting device may be used as a ground electrode of the antenna, the characteristics of the antenna may be improved as compared with the related art.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

Throughout the description, the word 'open' is used to mean that light and signals to/from the antenna may enter/leave the display device. In the particular implementations disclosed, this is achieved by providing gaps between the electrode pattern lines, but the skilled person will appreciate other ways of achieving this.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display apparatus with an integrated antenna, the display apparatus comprising:
a display panel being divided into a display area and a non-display area surrounding the display area, and including a pixel array part having pixels and an electrode array part provided on the pixel array part, wherein the electrode array part comprises:
an encapsulation layer provided on the pixel array part;
an electrode unit provided on the encapsulation layer; and
a passivation layer covering the electrode unit,
wherein the electrode unit comprises electrode patterns used as a touch screen, the electrode patterns comprising external patterns adjacent to the non-display area and internal patterns surrounded by the external patterns,
wherein a portion of the external patterns is driven as the touch screen in a touch mode and an antenna electrode in an antenna mode,
wherein the external patterns are divided into at least two antenna areas,
wherein the external patterns constituting any antenna area, among the at least two antenna areas, are used as the antenna electrode in the antenna mode, and
wherein the external patterns constituting a remaining antenna area, among the at least two antenna areas, are used as the touch screen in the touch mode.

2. The display apparatus of claim 1, wherein
a light emitting device provided in the pixel array part comprises:
an anode electrode;
a light emitting layer provided on the anode electrode; and
a cathode provided on the light emitting layer,
wherein the cathode is provided in an entire area of the display area.

3. The display apparatus of claim 1, wherein
after the antenna mode, when another antenna mode arrives, the external patterns constituting the remaining antenna area, among the at least two antenna areas, are used as the antenna electrode.

4. The display apparatus of claim 3, wherein
when the another antenna mode arrives, the external patterns constituting the any antenna area, among the at least two antenna areas, are used as the touch screen.

5. The display apparatus of claim 1, wherein
the electrode patterns form the touch screen according to a mutual-capacitance method.

6. The display apparatus of claim 1, wherein
among the external patterns, external patterns provided on a first side of the display area form a first antenna group,
external patterns provided on a second side of the display area facing the first side form a second antenna group,
external patterns provided on a third side between the first side and the second side of the display area form a third antenna group, and
external patterns provided on a fourth side of the display area facing the third side form a fourth antenna group.

7. The display apparatus of claim 6, further comprising:
a touch driver driving the electrode unit,
wherein the touch driver uses all the electrode patterns as the touch screen in the touch mode and connects at least one of the first antenna group to fourth antenna group to an antenna driver in the antenna mode.

8. The display apparatus of claim 1, wherein the electrode patterns form the touch screen according to a self-capacitance method.

* * * * *